(12) United States Patent
Geiger

(10) Patent No.: US 11,781,330 B2
(45) Date of Patent: Oct. 10, 2023

(54) WAVE GENERATOR BODY

(71) Applicant: G.WAVES GMBH, Lenggries (DE)

(72) Inventor: Johann Geiger, Lenggries (DE)

(73) Assignee: G.WAVES GMBH, Lenggries (DE)

( * ) Notice: Subject to any disclaimer, the term of this patent is extended or adjusted under 35 U.S.C. 154(b) by 0 days.

(21) Appl. No.: 17/877,741

(22) Filed: Jul. 29, 2022

(65) Prior Publication Data

US 2023/0116225 A1    Apr. 13, 2023

Related U.S. Application Data

(63) Continuation of application No. PCT/EP2021/078325, filed on Oct. 13, 2021.

(51) Int. Cl.
 *E04H 4/00* (2006.01)
(52) U.S. Cl.
 CPC .................................. *E04H 4/0006* (2013.01)
(58) Field of Classification Search
 CPC .................................................... E04H 4/0006
 USPC ............................................................. 4/491
 See application file for complete search history.

(56) References Cited

U.S. PATENT DOCUMENTS

| | | | |
|---|---|---|---|
| 3,802,697 A * | 4/1974 | Le Mehaute | A63G 3/02 4/491 |
| 3,913,332 A | 10/1975 | Forsman | |
| 6,047,657 A * | 4/2000 | Cox | B63B 21/56 114/343 |
| 6,928,670 B2 * | 8/2005 | Lochtefeld | E04H 4/0006 4/491 |

FOREIGN PATENT DOCUMENTS

| | | |
|---|---|---|
| WO | 90/06790 A1 | 6/1990 |
| WO | 00/05464 A1 | 2/2000 |
| WO | 2006/060866 A1 | 6/2006 |
| WO | 2010/059871 A1 | 5/2010 |
| WO | 2019/046549 A1 | 3/2019 |

OTHER PUBLICATIONS

International Search Report dated Jul. 6, 2022 as received in application No. PCT/EP2021/078325.

* cited by examiner

*Primary Examiner* — Lauren A Crane
(74) *Attorney, Agent, or Firm* — Maschoff Brennan

(57) ABSTRACT

A wave generator body, in the following body, configured to be moved through water along a track direction (T), comprises a first part forming the bow of the body when the body is moved through water along the track direction (T), a second part arranged downstream of the first part and forming the stern of the body when the body is moved through water along the track direction (T). The body is configured with a variable width (W).

10 Claims, 5 Drawing Sheets

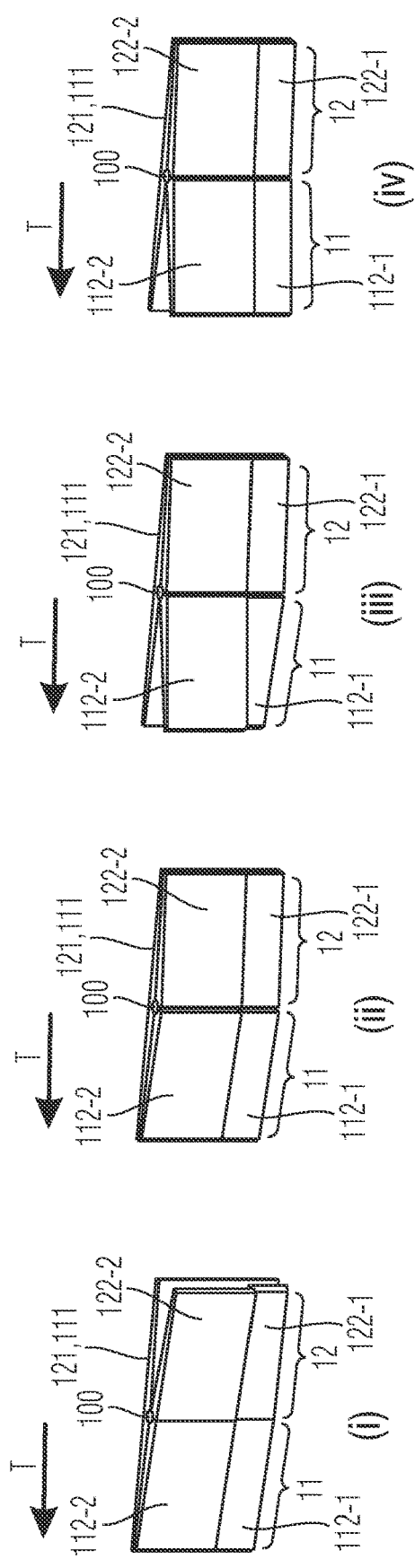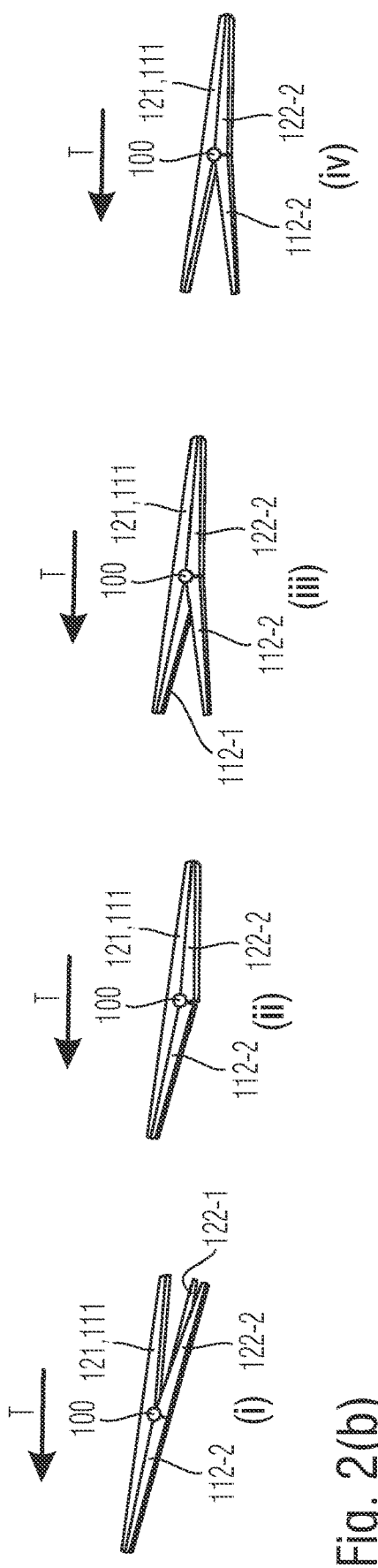
Fig. 2(a)
Fig. 2(b)

WAVE GENERATOR BODY

TECHNICAL FIELD

This specification refers to embodiments of a wave generator body, to embodiments of a traction system for guiding a wave generator body and to embodiments of a wave generator system comprising a wave generator body and a traction system for guiding the wave generator body.

BACKGROUND

Systems for generating a wave for surfing (or for other related sports or water activities) are, e.g., described in WO 2006/060866 A1, U.S. Pat. No. 3,913,332 and WO 2010/059871 A1.

Hence, instead of relying on natural waves caused by wind or waves caused by manned boats, it is desirable to produce a wave, e.g., suitable for surfing or for another related sport or water activity, with a dedicated wave generating system that can be installed in a pool or in natural water, such as a lake, a pond, a river or even at the sea, in order to be able to reliably generate, anytime, a wave exhibiting a defined characteristic.

For example, WO 2019/046549 A1 describes a wave pool and wave generating mechanism. The wave pool includes a bathymetry that includes a dynamically shapeable reef along a length or circumference of a channel that defines the wave pool. The wave generating mechanism includes a foil that has a shape for bi-directionality based on an adjustment of a yaw angle of the foil. The foil can be further controlled to increase or decrease certain surface areas or other angles of interacting with water in the wave pool.

SUMMARY

It is an object of the present invention to provide technical means that allow to flexibly generate different waves, e.g., for surfing.

According to an embodiment, a wave generator body, in the following body, configured to be moved through water along a track direction, comprises a first part forming the bow of the body when the body is moved through water along the track direction, a second part arranged downstream of the first part and forming the stern of the body when the body is moved through water along the track direction. The body is configured with a variable width.

For example, at least one of the first part and the second part includes at least one base member configured to be mounted to a traction system for moving the body through water; and at least one flap member coupled to an axis of the body, wherein the at least one flap member is configured to be partially rotated around the axis to variably set the width of the body.

For example, the width is perpendicular to the track direction.

For example, each of the at least one base member and each of the at least one flap member exhibits a substantially planar configuration.

For example, the body further comprises a mechanism configured to variably set the width.

For example, the mechanism is configured to set the width by rotating the at least one flap member around the axis by a certain angle with respect to the base member.

For example, the mechanism is configured to set said angle to substantially 0° such that the body exhibits a minimal width; to a value greater than 0° and smaller than a maximum such that the body exhibits a defined width greater than the minimal width; or to the maximum such that the body exhibits a maximal width.

For example, the first part is constructed in the same manner as the second part; the first part and the second part are symmetrically arranged with respect to the axis; and depending on the direction of movement of the body, either the first part or the second part forms the stern, and the other part forms the bow of the body.

For example, at least one of the first part and the second part includes at least two flap members, one of which being rotatably coupled to a first axis of the body, and the other one being rotatably coupled to a second axis of the body, wherein the first axis and the second axis are arranged at orientations different from each other.

According to a further embodiment, a traction system configured for guiding a wave generator body, in the following body, through water along a track direction, comprises a bottom track arranged at ground level and configured to guide a bottom portion of the body; a top track arranged above water level and laterally displaced from the bottom track by a distance along a direction perpendicular to the track direction; and a coupling part movably mounted at the top track and configured to be moved along the track direction, wherein the coupling part bridges said distance to couple to a top portion of the body.

For example, the top track is configured to be mounted at a sidewall spatially confining the water in which the wave is to be generated.

According to a further embodiment, a wave generator system comprises a wave generator body as described above and a traction system as described above.

For example, the wave generator system comprises a drive, e.g., a wire rope hoist, configured to move the body through water along the track direction.

For example, the drive is arranged behind the sidewall spatially confining the water in which the wave is to be generated.

For example, the wave generator system comprises a controller for controlling at least one of the movement of the body and the width.

For example, the wave generator system is configured to move the body back and forth along the track without turning the body.

Those skilled in the art will recognize additional features and advantages upon reading the following detailed description, and upon viewing the accompanying drawings.

BRIEF DESCRIPTION OF THE DRAWINGS

The parts in the figures are not necessarily to scale, instead emphasis is being placed upon illustrating principles of the invention. Moreover, in the figures, like reference numerals designate corresponding parts. In the drawings:

FIGS. 2(a) and (b) schematically and exemplarily illustrate, in respective two perspectives, four exemplary configurations of a wave generator body in accordance with one or more other embodiments;

DETAILED DESCRIPTION

In the following detailed description, reference is made to the accompanying drawings which form a part hereof and in which are shown by way of illustration specific embodiments in which the invention may be practiced.

In this regard, directional terminology, such as "top", "bottom", "below", "front", "behind", "back", "leading", "trailing", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

The term "horizontal" as used in this specification intends to describe an orientation substantially parallel to a horizontal surface of still water into which the body may be at least partially inlet. For example, both the track direction and the propagation direction mentioned below can be horizontal directions.

The term "vertical" as used in this specification intends to describe an orientation which is substantially arranged perpendicular to the horizontal surface, i.e., parallel to the normal direction of the still water surface. For example, the vertical direction mentioned below may be an extension direction that is perpendicular to both the track direction and the propagation direction.

Specific embodiments described in this specification pertain to a drive arrangement configured to move an unmanned body for generating a wave for surfing, e.g., to artificial wave generating systems for surfing waves and wakes, which can be applied to manmade pools or natural existing water bodies such as lakes, rivers, ponds, and other water buildups in any shape and form.

Figure 1A:
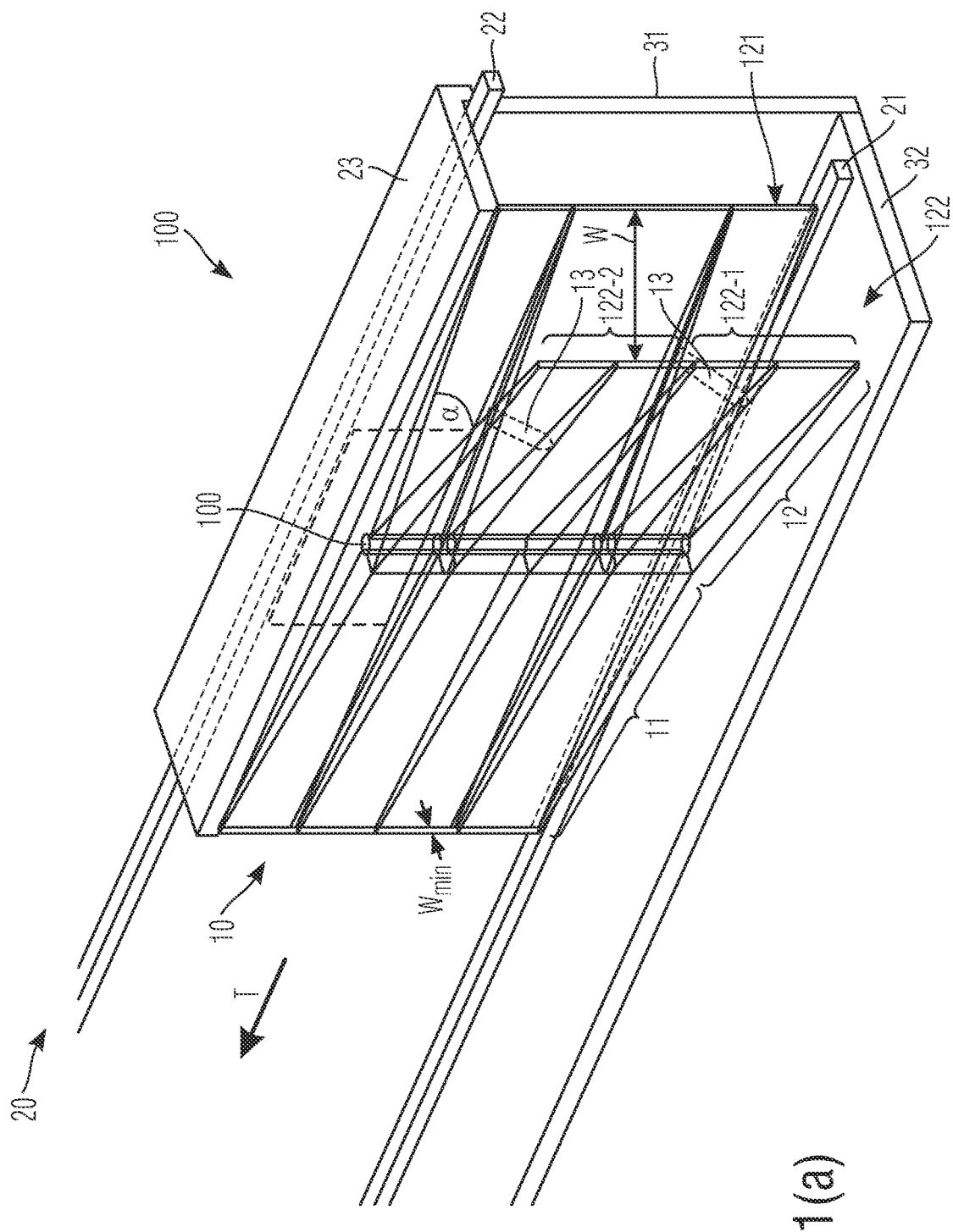
FIGS. 1(a) and 1(b) schematically and exemplarily illustrate, in two perspectives, a wave generator system in accordance with one or more embodiments.
Figure 1B:
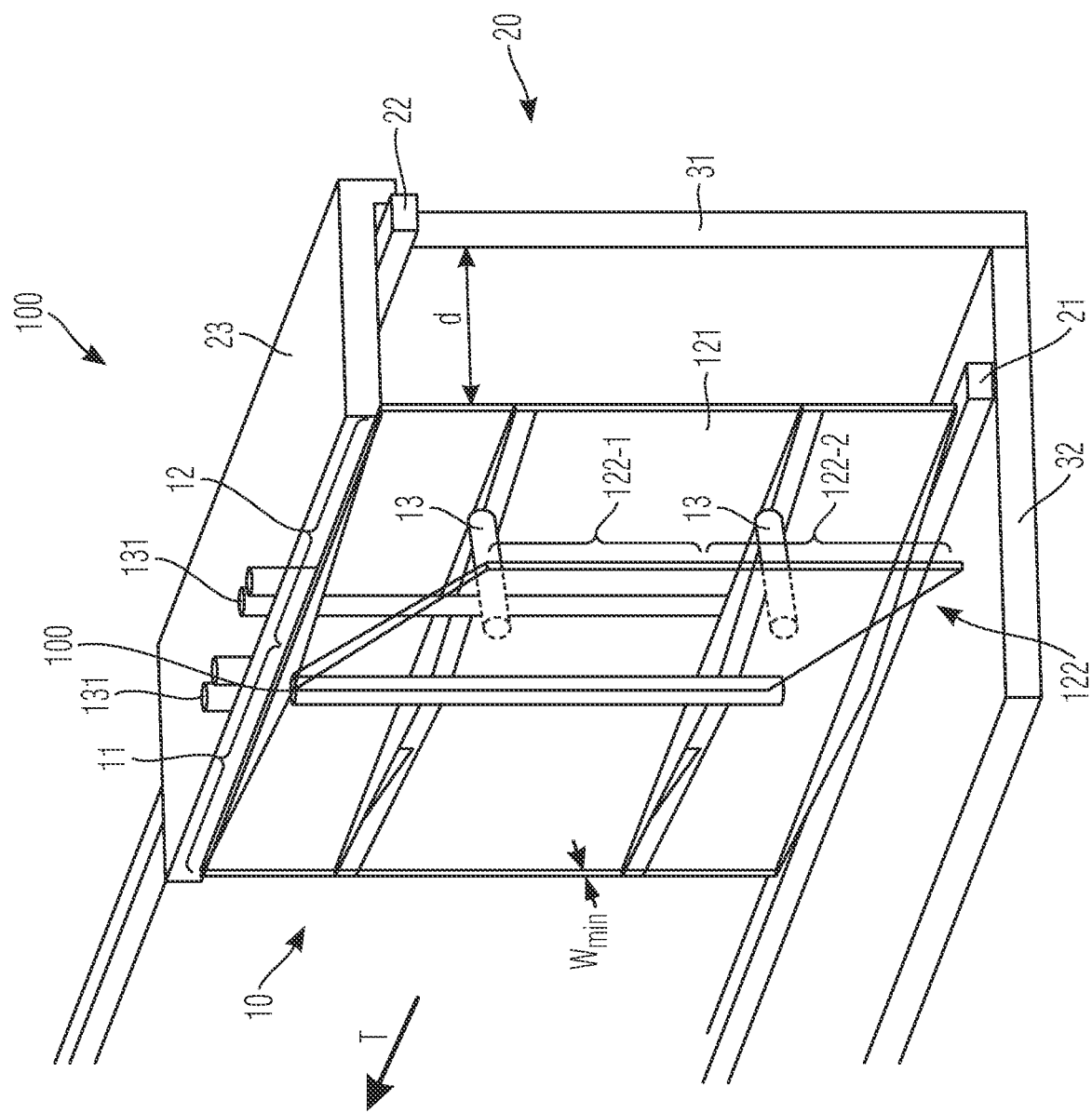

FIGS. 1(a) and 1(b) schematically and exemplarily illustrate, in two perspectives, a wave generator system 100 for generating a wave for surfing (or another water sport/activity). The wave generator system 100 may be arranged at a wave pool spatially confined by at least a sidewall 31 and a ground 32. The wave generator system 100 may also comprise such pool. Alternatively, the wave generator system 100 may be arranged at a natural water.

The wave generator system 100 comprises a wave generator body 10 and a traction system 20.

In an embodiment, the traction system 20 is configured for guiding the wave generator body 10, in the following also referred to as 'body 10', through water along a track direction T. By moving the body 10 through water, the wave is generated. The generated wave may be used for surfing or another water activity.

The characteristics of the wave, e.g., the wave speed, the wave size etc., depend, inter alia, on the movement (e.g., velocity, acceleration) of the body 10, the position of the body 10 within the water and the geometry of the body 10.

The present specification is directed to setting the wave characteristic based on a variably configurable geometry of the body 10.

Regarding first the traction system 20, this system 20 may comprise a bottom track 21, e.g., a bottom rail, arranged at ground level and configured to guide a bottom portion of the body 10. The traction system 20 may further comprise a top track 22, e.g., a top rail, arranged above water level and laterally displaced from the bottom track 21 by a distance d along a direction perpendicular to the track direction T.

Herein, the track direction T can be a linear direction in parallel to the water level. That is, the body 10 is moved, e.g., horizontally, in order to generate the wave, in accordance with some embodiments. For example, both the bottom track 21 and the top track 22 may exhibit a common horizontal extension of some 10 m or some 100 m. A typical length of horizontal extension of wave pools is within the range of 100 m to 500 m, and the traction system 20 and in particular the bottom track 21 and the top track 22 can be correspondingly dimensioned.

A coupling part 23 is movably mounted at the top track 22 and configured to be moved along the track direction T, wherein the coupling part bridges said distance d to couple to a top portion of the body 10.

In an embodiment, the body 10 is installed in the traction system 20 so as to be moved in and against the traction direction T, but with a fixed orientation with respect to the traction direction T. For example, in some embodiments, the body 10 is not configured to be entirely rotated or otherwise modified in orientation with respect to the track direction T.

For example, the top track 22 is mounted at the sidewall 31 spatially confining the water in which the wave is to be generated. Hence, based on the lateral distance d, a complex carrier structure directly above water level may be avoided.

Further, the traction system 20 may comprise a (non-illustrated) drive, e.g., a wire rope hoist, configured to move the body 10 through water along the track direction T. E.g., the drive is arranged behind the sidewall 31 spatially confining the water in which the wave is to be generated. Such arrangement can lead to a reduction of noise perceived by users of the wave (pool).

In an embodiment, the wave generator system 100 is configured to move the body 10 for at least 50 m along and against the track direction T (i.e., there and back/bidirectionally).

In addition, the traction system 20 may comprise a controller for controlling at least one of the movement of the body 10, e.g., the velocity and/or the acceleration of the body 10 along the track direction T, and a width W of the body 10 (the latter aspect being described in more detail below). E.g., the drive and the controller may be configured as described in co-pending German patent application DE 10 2020 121 513.4, the content of which being herewith incorporated in its entirety.

For example, the traction system 20 is further equipped with a memory and a user interface, both operably coupled with the controller. E.g., an operator of the wave generator system 100 may program software routines for movement patterns for the body 10, optionally including settings for a variable width W of the body 10 (cf. explanation further below). Data corresponding to such software routines may be uploaded in the memory and the controller may control the body 10 (its movement and/or its width) based on such data.

In an embodiment, the wave generator system 100 is configured to move the body 10 back and forth along the track 21, 22 (i.e., in and against the track direction T) without turning the body 10. Thus, as has been explained before, the orientation of the body 10 with respect to the track direction T must not necessarily be changed. Rather, in order to produce a wave by movement in both directions (in and against the track direction T), the geometry of the body 10 can be modified accordingly.

Now, a more detail description of exemplary embodiments of the body 10 will follow. As described above, the body 10 is configured to be moved through water along (and/or against) the track direction T in order to generate the wave.

The body 10 comprises a first part 11 forming the bow of the body 10 when the body 10 is moved through water along the track direction T. A second part 12 is arranged downstream of the first part 11 and forms the stern of the body 10 when the body 10 is moved through water along the track direction T.

In accordance with embodiment described herein, the body 10 is configured with a variable width W.

In an embodiment, and as herein illustrated, the first part 11 is constructed in the same manner as the second part 12. Further, the first part 11 and the second part 12 can be symmetrically arranged with respect to an axis 100. Depending on the direction of movement of the body 10 (i.e., either in or against the traction direction T), either the first part 11 or the second part 12 forms the stern, and the other part 11/12 forms the bow of the body 10. Thereby, the wave may be generated with similar characteristics, irrespective of whether the body 10 is moved along or against the traction direction T, and without the need of turning the body 10 by 180° or otherwise change its orientation with respect to the track direction T.

In the illustrated embodiments, the variable geometry of the body 10 is explained pre-dominantly with respect to the second part 12 that forms the stern of the body 10. However, it shall be understood that construction/configuration may alternatively or additionally be provided for the first part 11 (which forms the stern when the body 10 is moved against the traction direction T).

There are many possibilities of how to configure the body 10 with a variable width. Some of these will now be presented:

Referring to FIGS. 1(*a*) and 1(*b*), the second part 12 includes at least one base member 121 configured to be mounted to the traction system 20 and at least one flap member 122 coupled to the axis 100 of the body 10, wherein the at least one flap member 122 is configured to be partially rotated around an axis 100 to variably set the width W of the body 10. As explained above, the first part 11 may be constructed in the same manner Here, the second part 12 comprises one base member 121 which may be arranged at the bottom track 21 and, via the coupling part 23, at the top track 22. Further, the second part 12 comprises two flap members 122, a top flap member 122-2 and a bottom flap member 122-1.

For example, the flap members are dimensioned such a change of their respective orientation has an influence on the wave characteristics. E.g., each flap member 122-1, 122-2 has a substantially planar configuration and a front face area (e.g., a waterside surface) in the range of 1 m$^2$ to 30 m$^2$, e.g., 17.5 m$^2$ achieved by a rectangular area of 7.5 m*2.5 m.

It is emphasized that the second part 12 may also comprises only one flap member 122. For example, the second part 12 may essentially consist of one base member 121 and one flap member 122. In other embodiments, several flap members 122 are provided. Said flap members may each be coupled to the same axis 100 or to different axes (cf. FIG. 3).

Here, the width W refers to an extension of the body 10 in a direction perpendicular to the track direction T and in parallel to water surface. Said extension may (but must not necessarily) be present at the stern of the body 10.

Further, as illustrated, each of the at least one base member 121 and each of the at least one flap member 122 may exhibit a substantially planar configuration. For example, neither the first part 11 nor the second part 12 exhibits a curved surface, but only plane surfaces.

For example, the body 10 comprises a mechanism 13 configured to variably set the width W. E.g., in the embodiment as illustrated in FIGS. 1(*a*) and 1(*b*), the mechanism 13 comprises two arm-like structures, one for the bottom flap member 122-1 and the other for the top flap member 122-2. When the body 10 is in a "folded" state, these arm-like structures 13 may be fully housed by the base member 121. A driver 131 (cf. FIG. 1(*b*)) may be provided, e.g., in or at the body 10 and/or in or at the coupling part 23 to control the arm-like structures 13. For example, the arm-like structures 13 may be individually controlled, e.g., such only one of the bottom flap member 122-1 and the top flap member 122-2 is fold out.

Hence, the mechanism 13 can be configured to set the width W by rotating the flap member 122 around the axis 100 by a certain angle c with respect to the base member 121. E.g., the mechanism 13 is configured to set said angle c to substantially 0° such that the body 10 exhibits a minimal width Wmin;

a value greater than 0° and smaller than a maximum such that the body 10 exhibits a defined width W greater than the minimal width Wmin;

the maximum such that the body 10 exhibits a maximal width.

Individual settings related to the widths W and the movement of the body 10 may be stored, as explained above, in a memory of the wave generator system 100 that is accessed by the controller controlling the operation of the wave generator body 10.

Referring to FIGS. 2(*a*) and 2(*b*), some exemplary configurations of the width shall be explained. FIG. 2(*a*) shows a perspective view on four configurations (i) to (iv), and FIG. 2(*b*) shows top views corresponding thereto. For the configuration (i), it shall be assumed that the body 10 is moved along the track direction T, and for the configurations (iii) and (iv), it shall be assumed that the body 10 is moved against the track direction T. That is, the increased width may be set at the stern of the body 10. For the configuration (ii), the direction of movement is irrelevant due to the symmetric configuration of both parts 11 and 12.

In accordance with the embodiment illustrated in FIGS. 2(*a*) and 2(*b*), the base members 111 and 121 of the first and second parts 11, 12 are jointly formed by a monolithic base member. The first part 11 is constructed in the same manner as the second part 12. The first part 11 includes two flap members 112-1 and 112-2, and the second part 12 includes two flap members 122-1 and 122-2. The flap members are rotatably coupled to the axis 100. In how far the flap members are fold out depends on the designated characteristic of the wave to be generated.

According to configuration (i), both flap members 112-1 and 112-2 of the first part 11 are folded, thereby forming a minimal (bow) width. The flap members 122-1 and 122-2 of the second part are both fold out, the bottom flap member 122-1 to a lesser extent than the top flap member 122-2.

According to configuration (ii), all flap members 112-1, 112-2, 122-1 and 122-2 are folded, thereby defining a minimal width of the body 10 which may result in a comparatively small wave.

When exhibiting configuration (iii) or (iv), the body 10 may be moved against the track direction T. E.g., only the top flap member 112-2 of the second part 12 is fold out (cf. configuration (iii)), or both the top flap member 112-2 and the bottom flap member 112-1 of the first part 11 are fold out (cf. configuration (iv)), whereas both flap members 122-1 and 122-2 of the second part, then forming the bow of the body 10, are folded.

Figure 3:
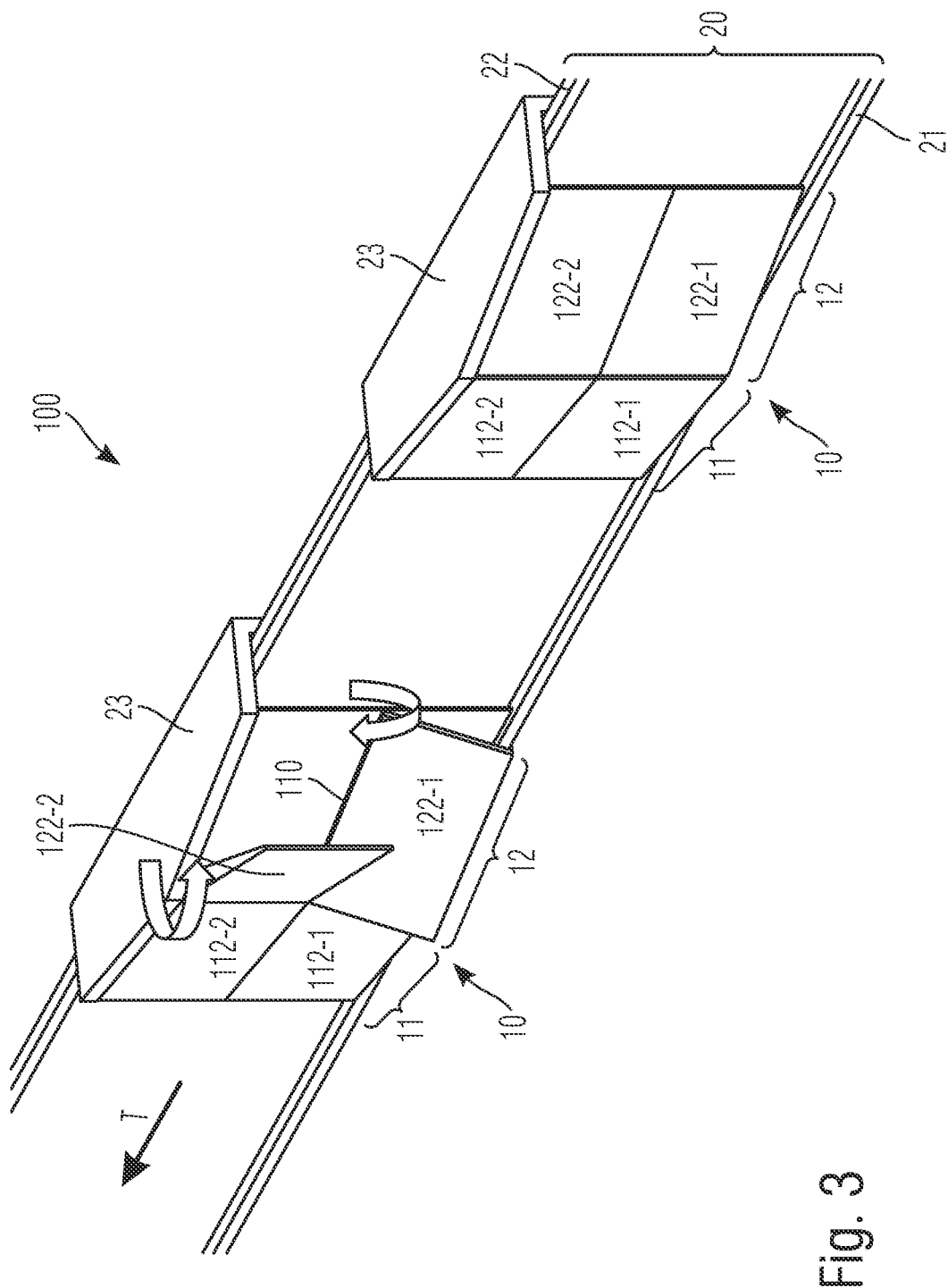
FIG. 3 schematically and exemplarily illustrates a wave generator system in accordance with one or more embodiments.

FIG. 3 illustrates a further embodiment of the body 10 installed in the wave generator system 100. The body 10 is shown in two positions. In the first position (lower right portion of FIG. 3), all flap members all flap members 112-1, 112-2, 122-1 and 122-2 are folded. In the second position, the flap members 112-1 and 112-2 of the first part 11 (forming the bow of the body 10 when the same is moved along the track direction T) are folded, whereas both the upper flap member 122-2 and the bottom flap member 122-1 of the second part 12 (forming the stern) are fold out. There, the upper flap member 122-2 is rotatably coupled to the axis 100, whereas the bottom flap member 122-1 is rotatably coupled to another axis 110 orientated differently as the axis 100.

That is, if the body 10 is equipped with several flap members, each of the flap members may be rotatably coupled to an individual axis. Such configuration allows setting the body 10 into divers geometries defining various widths, which in in turn yields even more possibilities for designing the characteristics of the wave.

In more general words, in an embodiment of the body 10, at least one of the first part 11 and the second part 12 includes at least two flap members 122-1, 122-2, one of which 122-2 being rotatably coupled to a first axis 100 of the body 10 (cf. curved arrow in FIG. 3 at top flap member 122-2), and the other one 122-1 being rotatably coupled to a second axis 110 of the body 10 (cf. curved arrow in FIG. 3 at bottom flap member 121-2), wherein the first axis 100 and the second axis 110 are arranged at orientations different from each other. E.g., the two axes may be arranged perpendicular to each other.

Figure 4:
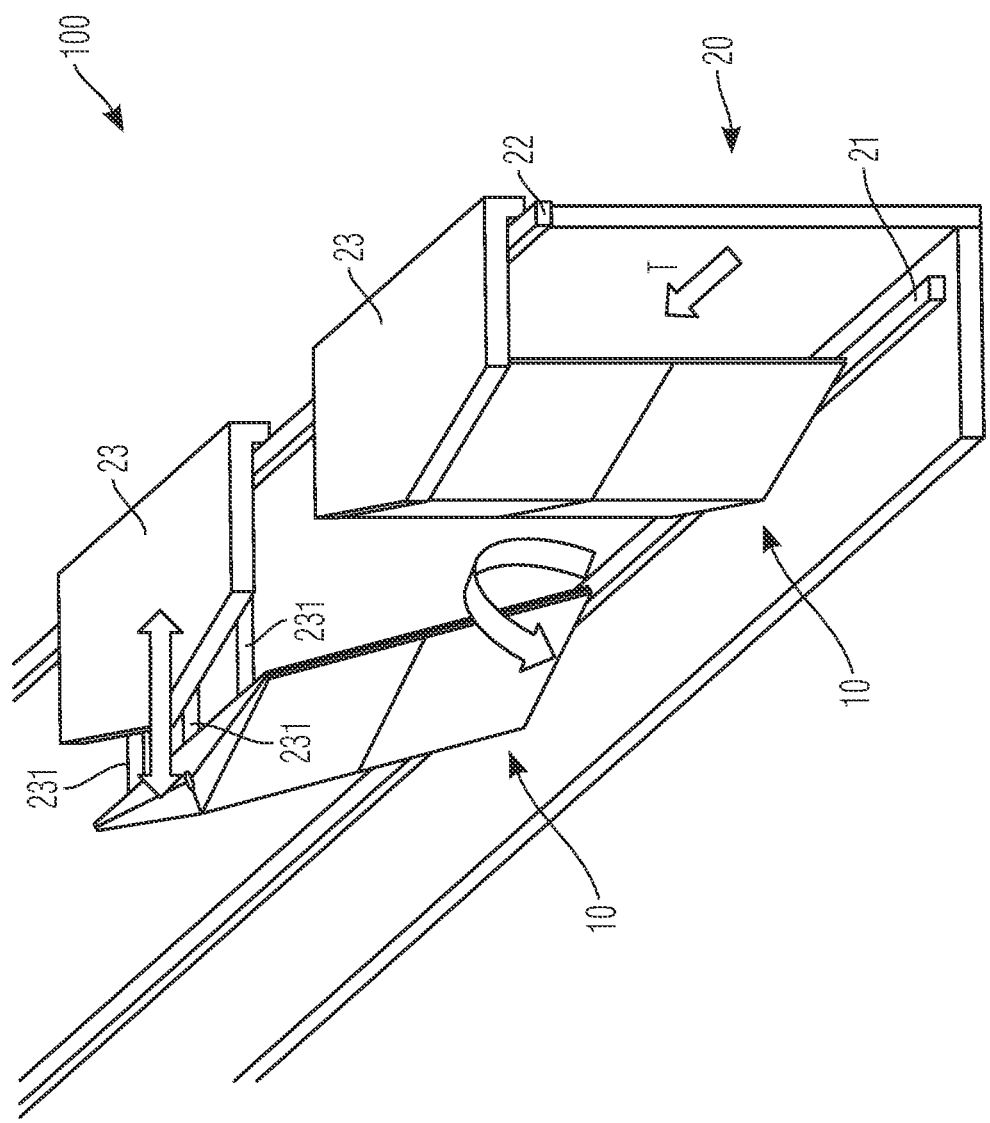
FIG. 4 schematically and exemplarily illustrates a wave generator system.

FIG. 4 illustrates a further example of the body 10 installed in the wave generator system 100. The body 10 is shown in two positions. There, the width of the body 10 is not necessarily varied. By contrast, different wave characteristics may be achieved by changing the orientation of the entire body 10 with respect to the traction system 10. In the first position (lower right portion of FIG. 4), the body 10 is not tilted. In the second position, the body 10 is tilted as illustrated, wherein the bottom track 21 or, respectively, a component of the bottom portion of the body 10 at the bottom track 21 may form the axis of rotation. E.g., a telescopic module 231 at the coupling part 23 is attached to the top portion of the body 10 and may set the degree of tilt of the body 10. The concept as illustrated in FIG. 4 may be combined with the concept of the variably configurable body width described above.

Spatially relative terms such as "under", "below", "lower", "over", "upper" and the like, are used for ease of description to explain the positioning of one element relative to a second element. These terms are intended to encompass different orientations of the respective device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", "exhibiting" and the like are open ended terms that indicate the presence of stated elements or features, but do not preclude additional elements or features.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A wave generator body, in the following body, configured to be moved through water along a track direction, comprising:
   a first part forming a bow of the body when the body is moved through water along the track direction, and
   a second part arranged downstream of the first part and forming a stern of the body when the body is moved through water along the track direction;
   wherein:
      the body is configured with a variable width, and wherein at least one of the first part and the second part includes
      at least one base member configured to be mounted to a traction system for moving the body through water; and
      at least one flap member coupled to an axis of the body, wherein the at least one flap member is configured to be partially rotated around the axis to variably set the width of the body.

2. The body of claim 1, wherein the width of the body is perpendicular to the track direction.

3. The body of claim 1, wherein each of the at least one base member and each of the at least one flap member exhibits a substantially planar configuration.

4. The body of claim 1, further comprising a mechanism configured to variably set the width of the body.

5. The body of claim 4, wherein the mechanism is configured to set the width by rotating the at least one flap member around the axis by a certain angle with respect to the base member.

6. The body of claim 5, wherein the mechanism is configured to set said angle to:
   substantially 0° such that the body exhibits a minimal width;
   a value greater than 0° and smaller than a maximum such that the body exhibits a defined width greater than the minimal width; and
   the maximum such that the body exhibits a maximal width.

7. The body of claim 4, wherein the mechanism is configured to set the width by rotating the at least one flap member around the axis by a certain angle with respect to the base member.

8. The body of claim 7, wherein the mechanism is configured to set said angle to:

substantially 0° such that the body exhibits a minimal width;

a value greater than 0° and smaller than a maximum such that the body exhibits a defined width greater than the minimal width; and the maximum such that the body exhibits a maximal width.

9. The body of claim 1, wherein:

the first part is constructed in the same manner as the second part;

the first part and the second part are symmetrically arranged with respect to the axis; and depending on the direction of movement of the body, either the first part or the second part forms the stern, and the other part forms the bow of the body.

10. The body of claim 1, wherein at least one of the first part and the second part includes at least two flap members, one of which being rotatably coupled to a first axis of the body, and the other one being rotatably coupled to a second axis of the body, wherein the first axis and the second axis are arranged at orientations different from each other.

\* \* \* \* \*